United States Patent
Toyama et al.

(10) Patent No.: US 7,222,300 B2
(45) Date of Patent: May 22, 2007

(54) SYSTEM AND METHOD FOR AUTOMATICALLY AUTHORING VIDEO COMPOSITIONS USING VIDEO CLIPLETS

(75) Inventors: Kentaro Toyama, Redmond, WA (US); Andreas Soupliotis, Bothell, WA (US); Sheldon R. Fisher, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 738 days.

(21) Appl. No.: 10/177,460

(22) Filed: Jun. 19, 2002

(65) Prior Publication Data

US 2003/0234806 A1    Dec. 25, 2003

(51) Int. Cl.
G11B 27/031    (2006.01)
G06F 17/30    (2006.01)
G11B 27/028    (2006.01)

(52) U.S. Cl. .................. 715/723; 715/500.1; 715/721; 725/28; 725/41

(58) Field of Classification Search ............... 715/719, 715/500.1, 725, 723, 721, 716; 725/28, 41, 725/46

See application file for complete search history.

(56) References Cited

U.S. PATENT DOCUMENTS 5,956,026 A *    9/1999    Ratakonda .................. 715/723
6,710,785 B1 *    3/2004    Asai et al. .................. 715/723

FOREIGN PATENT DOCUMENTS

EP    0 920 015 A2    11/1998
WO    WO 02/01548 A1    1/2002

OTHER PUBLICATIONS

J. Boreczky, A. Girgensohn, G. Golovchinsky and S. Uchihashi, *An Interactive Comic Book Presentation for Exploring Video*, In CHI 2000 Conference Proceedings, ACM Press, pp. 185-192, 2000.
J. Boreczky and L.D. Wilcox, *A Hidden Markov Model Framework for Video Segmentation Using Audio and Image Features*, In Proceedings of the International Conference on Acoustics, Speech and Signal Processing (Seattle, WA), vol. 6, 1998 pp. 3741-3744.

(Continued)

Primary Examiner—Raymond J. Bayerl
Assistant Examiner—Namitha Pillai
(74) Attorney, Agent, or Firm—Lyon & Harr, L.L.P.; Craig S. Fischer (57) ABSTRACT

The present invention includes a system and a method for automatically authoring video compositions from longer units of digitized video (or a source video) by using short segments of video (or video "cliplets"). The video composition authoring process provides an aesthetically-pleasing layout of data elements to create a video composition. The data elements include multimedia elements, parameter information and description information. Any data elements that are missing but required are automatically selected by the system. The user may then review preliminary video composition results and refine the results if desired. The video composition authoring system includes an element selection and layout module for selecting the data elements in the video composition, and an iterative refinement module that allows the user to change and refine the preliminary results.

16 Claims, 7 Drawing Sheets

OTHER PUBLICATIONS

P. Chiu, A. Girgensohn, W. Polak, E. Rieffel and L. Wilcox, *A Genetic Algorithm for Video Segmentation and Summarization, In Proceedings of ICME* (IEEE Multimedia), 2000.

A. Girgensohn, S. Bly, F. Shipman, J. Boreczky and L. Wilcox, *Home Video Editing Made Easy—Balance Automation and User Control, In Human-Computer Interaction INTERACT '01*, IOS Press, pp. 464-471, 2001.

A. Girgensohn and J. Boreczky, *Time-Constrained Keyframe Selection Technique, In IEEE Multimedia Systems 1996*, IEEE Computer Society, vol. 1, pp. 756-761, 1999.

A. Girgensohn, J. Boreczky, P. Chiu, J. Doherty, J. Foote, G. Golovchinsky, S. Uchihasi and L. Wilcox, *A Semi-Automatic Approach to Home Video Editing, In UIST 2000 Proceedings*, ACM Press, pp. 81-89.

A. Girgensohn and J. Foote, *Video Classification Using Transform Coefficients, In Proceedings of the International Conference on Acoustics, Speech and Signal Processing* (Phoenix, AZ), vol. 6, pp. 3045-3048, 1999.

A. Hauptmann and M.A. Smith, *Text, Speech, and Vision for Video Segmentation: The Informedia™ Project, AAAI Fall Symposium on Computational Models for Integrating Language and Vision*, Boston, MA, Nov. 10-12, 1995.

H. Jiang, T. Lin and H. Zhang, *Video Segmentation with the Support of Audio Segmentation and Classification*, Microsoft Research, China, 1999.

Z.N. Li and J. Wei, *Spatio-Temporal Joint Probability Images for Video Segmentation, In Proceedings of the IEEE International Conference on Image Processing* (ICIP 2000), vol. II, pp. 295-298, 2000.

E. Sifakis, I. Grinias and G. Tziritas, *Video Segmentation Using Fast Marching and Region Growing Algorithms, In EURASIP Journal on Applied Signal Processing*, 2002:4, pp. 379-388, 2002.

C.M. Taskiran, A. Amir, D. Ponceleon and E.J. Delp, *Automated Video Summarization Using Speech Transcripts, In Proceedings of the SPIE Conference on Storage and Retrieval for Media Databases 2002*, Jan. 20-25, 2002, San Jose, CA.

C.M. Taskiran and E.J. Delp, *A Study on the Distribution of Shot Lengths for Video Analysis, In Proceedings of the SPIE Conference on Storage and Retrieval for Media Databases 2002*, Jan. 20-25, 2002, San Jose, CA.

S. Uchihashi and J. F7oote, *Summarizing Video Using a Shot Importance Measure and a Frame-Packing Algorithm, In Proceedings of the International Conference on Acoustics, Speech and Signal Processing* (Phoenix, AZ), vol. 6, pp. 3041-3044, 1999.

S. Uchihashi, J. Foote, A. Girgensohn and J. Boreczky, *Video Magna: Generating Semantically Meaningful Video Summaries, In Proceedings ACM Multimedia*, (Orlando, FL), ACM Press, pp. 383-392, 1999.

L. Wilcox and J. Boreczky, *Annotation and Segmentation for Multimedia Indexing and Retrieval, In Proceedings of the Thirty-First Annual Hawaii International Conference on System Sciences*, (Wailea, Hawaii), vol. II, pp. 259-267, Jan. 1998.

C. Wills, *Video Segmentation for Post-Production, In Proceedings of the SPIE Conference on Storage and Retrieval for Media Databases 2002*, Jan. 20-25, 2002, San Jose, CA, vol. 4676, pp. 158-167.

\* cited by examiner

SYSTEM AND METHOD FOR AUTOMATICALLY AUTHORING VIDEO COMPOSITIONS USING VIDEO CLIPLETS

TECHNICAL FIELD

The present invention relates in general to processing of digital video and more particularly to a system and a method for automatically authoring video compositions from digitized video and other digital multimedia by using short segments of video (or video "cliplets").

BACKGROUND OF THE INVENTION

Video cameras (or camcorders) are devices that are popular with amateur videographers for home use. Video cameras may be a digital camera, which stores digital video on a memory device, or an analog video camera, which stores video footage on magnetic videotape. Video footage captured by an analog video camera may be converted into digitized format using well-known techniques. This digital video may be processed using a software running on a computing devices (such as personal computers) to edit and manipulate the data captured by video cameras.

The traditional home digital video paradigm expects a user to shoot good video, perform tedious video editing, and then output a single large video containing the edited movie. One problem, however, with this paradigm is that raw video footage, even when professionally photographed, is difficult and tedious to edit. Professional editors with professional training and using high-end editing tools can take hour to edit raw video into a final version that is just minutes in duration. Moreover, most raw video footage is boring and poring over hours of raw video is quite a tedious task, especially for an amateur.

Yet another problem is that current video editing software for amateur use is modeled after professional editing systems. This tends to make the software difficult for the average consumer to use. User interfaces of current video editing software typically provide a user with one view of the raw video footage. A timeline is placed along side the footage to give the user temporal orientation. The timeline may include several different "tracks", such as a video 1 track, a video 2 track, an audio 1 track, and so forth. The user interface includes controls similar to a VCR, such as play, fast-forward and rewind buttons. Using these buttons, a user browses the video footage by moving back and forth across the footage using the controls. This process of browsing the video footage is called "scrubbing".

Still another problem is that current video editing software assumes that the output is yet another video, in which simple playback is the intended mode of viewing. Users may, however, wish to create other compositions with their video. These compositions include a two-dimensional layout of video that is analogous to a photo album, and a hyperlinked document in which the user chooses how to navigate the composition interactively.

Nevertheless, an amateur videographer often desires to produce nice, shorter video compositions of their longer, unedited raw video footage. The video composition may be, for example, a "highlights" video that contains the most interesting segments of the raw video footage, or a 2D video album, or an interactive hypertext document. However, the editing process of scrubbing the video to determine the location of cuts in the video footage is a tedious, repetitive and time-consuming task and must be performed manually.

Thus, for the average consumer the process of editing video to produce a video composition is a difficult and burdensome task.

Accordingly, there exists a need for a video composition authoring system and method that provides an easy or an automatic production of arbitrary types of video compositions from digitized video without requiring a user to endure the editing process typically involved in producing such a composition.

SUMMARY OF THE INVENTION

The video composition authoring system and method described herein is capable of authoring video compositions that contain video cliplets. In general, a video cliplet (or "cliplet") is an ultra-short segment of digital video created by dividing up longer units of video (or a source video). Typically, a video cliplet is expected to be approximately between five and ten seconds in duration, but may be any length in practice. The video composition includes a two-dimensional arrangement or collage of multimedia elements such as music, text, and photographs and also includes a single viewing window where cliplets are chained together and played consecutively (such as a highlight video of a video).

The video composition authoring system of the invention overcomes the problems of the traditional home video editing software by using cliplets—video of very short duration—as the main unit of manipulation, rather than a large source video. Authoring of video composition allows a user to interactively author a video composition from a source video while alleviating the tedious editing process. Editing with cliplets means that the pieces are pre-cut, and that manipulation of video is performed on short segments of video instead of long, tedious stretches of video. In addition, a user can have as much or as little interaction with the system as desired. Any information not provided interactively by the user is intelligently provided by the system.

In general, the video composition authoring system method provides an aesthetically-pleasing layout of data elements to create a video composition. The data elements include multimedia elements, parameter information and description information. By way of example, multimedia elements include a set of video cliplets, video, background music, background photographs, clip art, text descriptions, titles, and so forth. Moreover, parameter information describe parameters of the video composition and includes, for example, the size of the composition and the duration of each video within the video composition. In addition, the description information includes, for example, time and location information about the cliplets or video and a description of the desired style or mood of the composition.

Any data elements that are missing but needed (as determined by the system) are automatically selected by the system. If a user specifies less than all the necessary data elements needed to author a video composition the system automatically chooses the missing elements. From these selections, preliminary video composition results are generated for user review. If the user likes the preliminary video composition results the preliminary video composition results become the output video composition. Otherwise, the user is allowed to make refinements and changes to change any portion of the preliminary video composition results until the user is satisfied.

The video composition authoring system includes an element selection and layout module for selecting the data elements and designing the layout of the elements in the video composition. The element selection and layout module uses those data elements selected by a user in the user input. If there is no user input, then the element selection and layout module automatically selects data elements to, use. Any data elements that are needed to complete the video composition but were not specified by the user are automatically selected by the element selection and layout module to complement or supplement the user's choices. The element selection and layout module allows functionality and interactive with the data elements using, for example, cliplet interest ratings and usage statistics.

The video composition authoring system also includes an iterative refinement module for presenting preliminary video compositions results to the user and allowing the user to change and refine any elements as desired by the user. The iterative refinement module allows the user to change parameters, manually drag and drop different cliplets into the composition, add text bubbles to the cliplets, and crop certain cliplets using tracking algorithms to track moving objects. The changes are made by the iterative refinement module and updated preliminary video composition results containing the refinements are presented to the user. Once the user is satisfied with the current preliminary video composition results, the authoring process is finished and a finished video composition sent as output. The output form of the finished video composition can be, for example, a two-dimensional collage, a single movie, or a photoalbum-style hypertext "book". The output form can be selected by the user or, in the absence of a user choice, be automatically selected by the system.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction to Video Cliplets

The video composition authoring system and method described herein is capable of authoring video compositions that contain video cliplets. In general, a video cliplet (or "cliplet") is an ultra-short segment of digital video created by cutting up longer units of video (or a source video). The duration of the cliplet is restricted by a hard or soft constraint that is determined manually by a user or automatically. Typically, a video cliplet is expected to be approximately between five and ten seconds in duration, but may be any length in practice.

The idea of cliplets is that meaningful and short segments of video are extracted from longer units of video with only secondary regard for what are traditionally considered shot boundaries. Cliplets, therefore, can be based on other non-traditional cues such as audio cues (such as trying to detect sound bites) or video cues (such as trying to detect zoomed-in close ups). In addition, cliplets can overlap. Cliplets may not cover all of the entire source video. This means that a really boring and uninteresting section of the source video may be excluded altogether. All of this achieves the goal of having each cliplet be a semantically meaningful portion of video.

The following features distinguish a cliplet from other segments of video. First, prior to generation a duration constraint (i.e., a constraint on the cliplet length) is determined. This constraint may take the form of hard upper and lower bounds, or it may be a soft constraint that takes into account other factors, such as average cliplet length over the source video, frequency of sub-shot boundaries, variance in cliplet length, local features of the audio or video, and so forth. Second, a cliplet does not necessary need to be an independent video. The cliplet could be a pair of starting and stopping points denoting where to cut a large video for extract the cliplet, or any other representation of a subsequence of video. Third, a cliplet is a semantically meaningful portion of video containing what a viewer might consider a single short event (such as a sound bite). The cliplet has a single theme or a common thread that makes the cliplet stand apart from the source video.

The relatively short length of a cliplet as compared to the source video allows the cliplet to be manipulated more like a digital photograph rather than digital video. Video cliplets allow a shift from away from large videos that are burdensome to manipulate and store. Cliplets focus on short, exciting segments of video rather than on long, dull videos. Consumers tend to become bored watching hours of a long video that contains only a few interesting scenes. Rather than constantly using the fast-forward button, cliplets allow consumers to extract the interesting scenes, the "heart" of the long source video.

Cliplets also are easier than large source videos to manipulate and store. User resistance to uploading and sharing videos due to their large size is minimized by generating cliplets from the source video. Cliplets avoid multi-megabyte or multi-gigabyte source videos. By definition, cliplets are smaller than a source video. Thus, operations that are impractical on a source video due to limited memory, storage, processing power, bandwidth or human attention can be performed with ease on cliplets. Because of its smaller size, a cliplet has a shorter upload time, makes fewer demands on bandwidth, requires less disk space and generally is easier to manage than a large source video.

Most operations that apply to a digital photograph have an analog for video cliplets. Because of its small size, a video cliplet can be browsed using thumbnails, organized by time stamp and gross pixel statistics, cut and pasted into documents, and sent easily over e-mail. In theory, most of these operations already exist for videos but in practice the capabilities are rarely used by consumers because typical home videos are too large, too long and too boring. Image processing and computer vision algorithms that are unable to process large source videos can be used easily on cliplets. Technologies such as image stabilization, color correction, panorama creation, three-dimensional depth understanding, face recognition, person tracking can be used on cliplet in real time.

Figure 1:
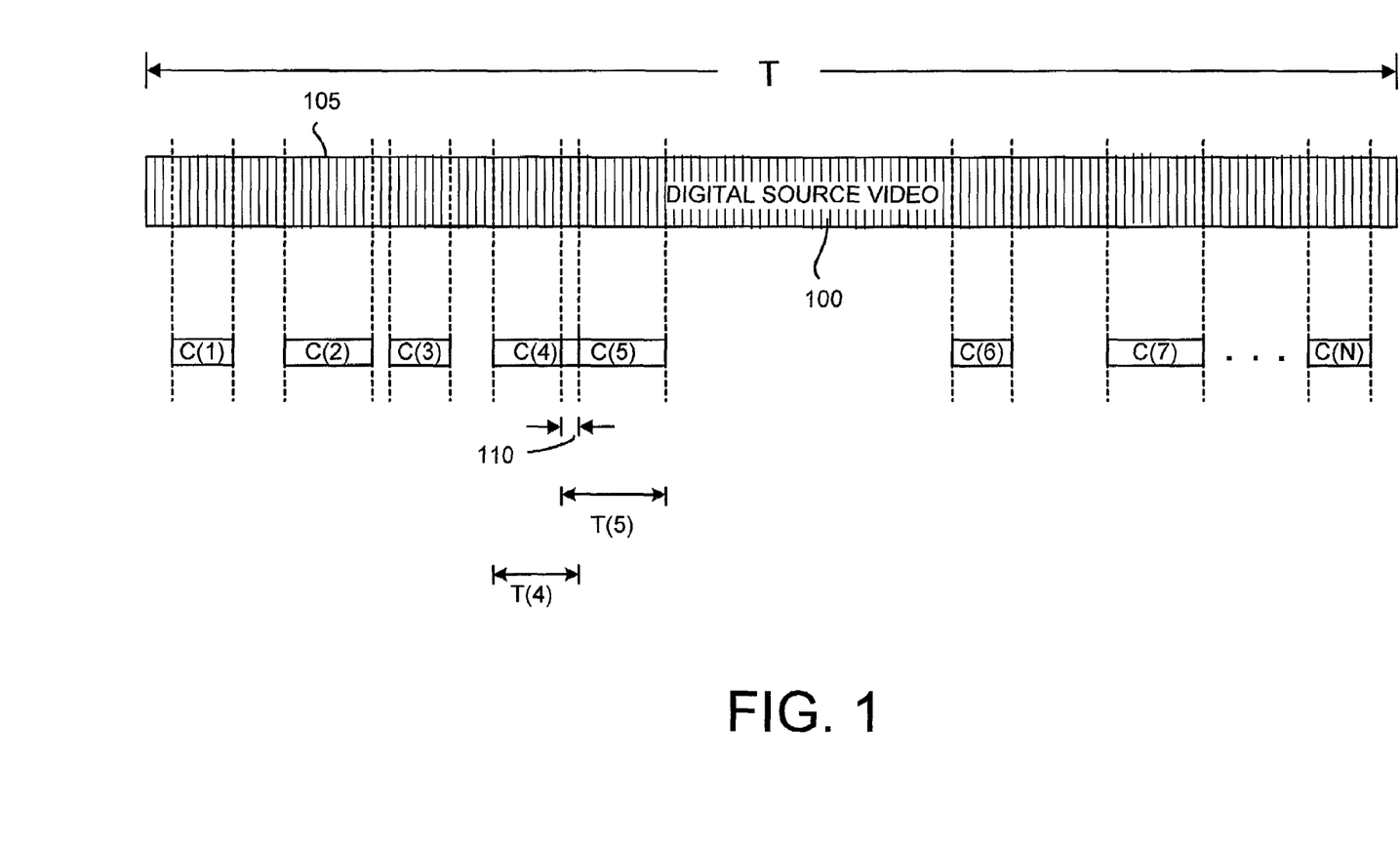
FIG. 1 is a diagram illustrating the concept of the video cliplet in relation to a longer unit of video and video frames.

FIG. 1 is a diagram illustrating the concept of the video cliplet in relation to a source video and video frames. A digital source video 100 of length or duration T contains a plurality of video frames 105. As shown in FIG. 1, the digital source video 100 is divided into a plurality of cliplets C(1) to C(N). These cliplets can be of varying lengths.

As explained above, each of these cliplets, C(1) to C(N), is a semantically meaningful portion of the source video 100. In some cases, two or more cliplets can overlap in time and thus share the same video frames. Referring to FIG. 1, cliplet C(4) has a length T(4) and cliplet C(5) has a length T(5). Even though T(4) is less than T(5), cliplets C(4) and C(5) overlap in time. In addition, cliplets C(4) and C(5) share the video frames shown by reference numeral 110.

II. General Overview

The video composition authoring system and method of the present invention has the capability to work with video cliplets. However, it should be noted that video cliplets are not necessary. The input to the video composition authoring system includes data elements such as, for example, a set of cliplets, video files, a set of directories containing cliplets, and links to cliplets. The output of the system is a aesthetically-pleasing layout or composition that may contain cliplets and other multimedia elements such as music, text and photographs. The video composition output can be thought of as a collage of multimedia elements that are brought together for the purpose of creating the composition. The word "collage" is meant to suggest that smaller elements are pieced together, in time, in space, or both, to create a larger composition. By way of example, a two-dimensional layout of cliplets displayed on a screen is a collage, and so is a single movie composed of several cliplets playing on the screen one after another.

Figure 2:
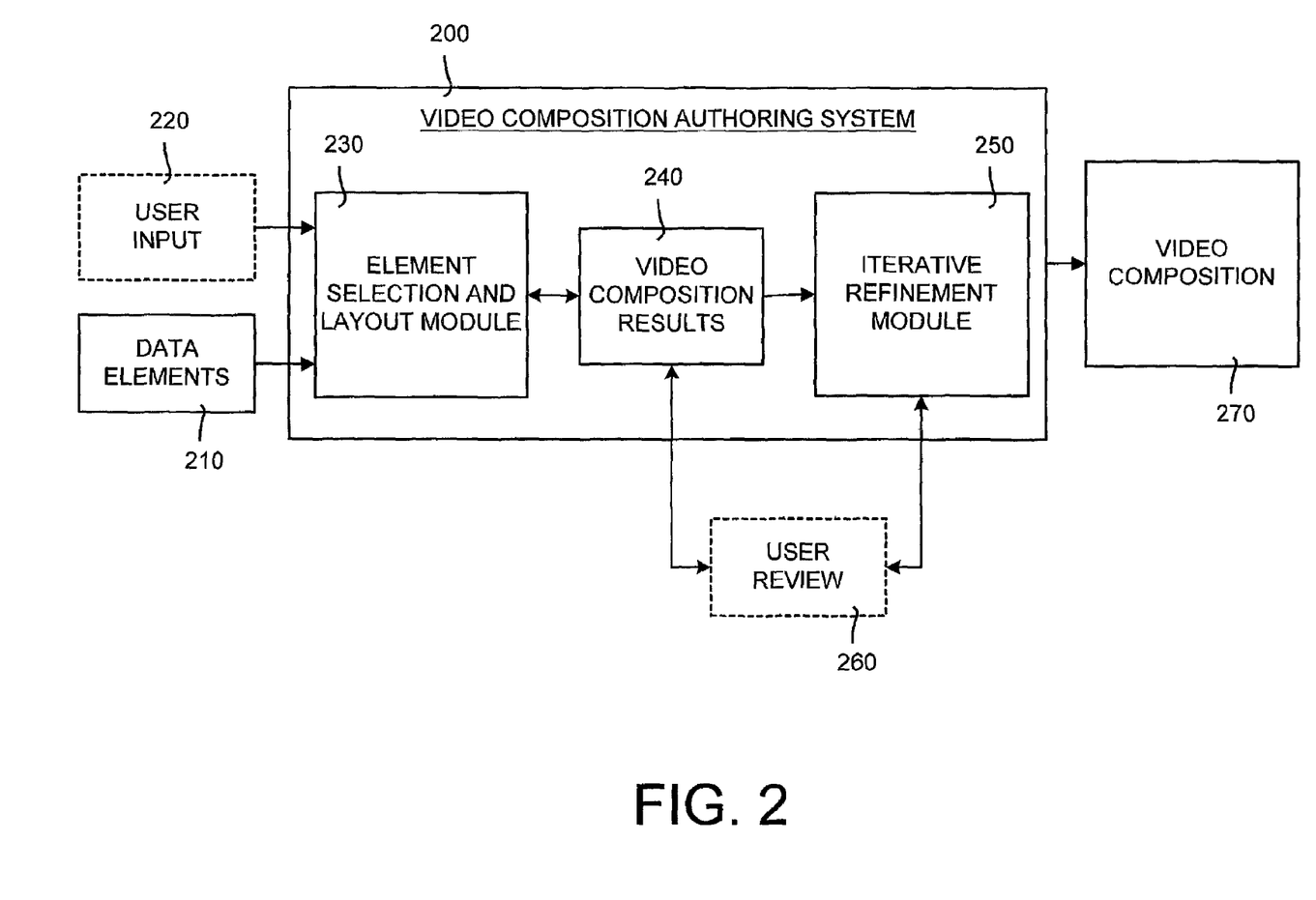
FIG. 2 is a block diagram illustrating an overview of the video composition authoring system of the present invention.

FIG. 2 is a block diagram illustrating an overview of the video composition authoring system 200 of the present invention. In general, the system 200 inputs initial information and outputs a video composition containing multimedia elements. Specifically, the video composition authoring system 200 inputs data elements 210. The data elements include multimedia elements, parameter information and description information. By way of example, multimedia elements include a set of video cliplets, video, background music, background photographs, clip art, text descriptions, titles, and so forth. Moreover, parameter information describe parameters of the video composition and includes, for example, the size of the composition and the duration of each video within the video composition. In addition, the description information includes, for example, time and location information about the cliplets or video and a description of the desired style or mood of the composition.

A user input 220 can be used to select all, none, or any amount between of the data elements 210 to used as input. This user input 220 is an optional process, as shown by the dashed line. If no user input 220 is received, the system 200 automatically selects the data elements 210.

The video composition authoring system 200 includes an element selection and layout module 230 for selecting the data elements and designing the layout of the elements 210 in the video composition. The element selection and layout module 230 uses those data elements 210 selected by a user in the user input 220. If there is no user input 220, then the element selection and layout module 230 automatically selects data elements 210 to use. If there is user input 220 the element selection and layout module 230 uses those data elements 210 as selected by the user. Any data elements 210 that are needed to complete the video composition but were not specified by the user are automatically selected by the element selection and layout module 230 to complement or supplement the user's choices.

Depending on the user's choice of output (or automatically selected if there is no user input 220 available), the element selection and layout module 230 applies an automatic layout algorithm to layout the selected data elements 210. Automatic layout of the data elements 210 occurs in an aesthetically-pleasing manner while respecting any constraints and requests specified by the user in the user input 220. These constraints may be explicit as specified by the user or implicit based on hardware limitations (such as the viewing size of a monitor). Output from the element selection and layout module 230 are preliminary video composition results 240. At this point, the element selection and layout module 230 has generated a preliminary video composition containing selected data elements and in a preliminary layout.

The video composition authoring system 200 includes an iterative refinement module 250 for presenting the preliminary video composition results 240 to the user and allowing the user to change and refine any elements the user does not like. In particular, the iterative refinement module 250 present the preliminary video composition results 240 to the user for a user review 260. The user review. 260 is an optional process, as shown by the dashed lines. If no user review 260 occurs, then the video composition authoring system 200 outputs the preliminary video composition results 240 as a final output.

During the user review 260, the user can view the preliminary video composition results 240 and determine the portions that are unacceptable to him. For example, the iterative refinement module 250 allows the user to change parameters, manually drag and drop different cliplets into the composition, add text bubbles to the cliplets, and crop certain cliplets using tracking algorithms to track moving objects. The changes are made by the iterative refinement module 250 and updated preliminary video composition results 240 containing the refinements are presented to the user. Once the user is satisfied with the current preliminary video composition results 240, the authoring process is finished and a finished video composition 270 is outputted. The output form of the finished video composition 270 can be, for example, a two-dimensional collage, a single movie, or a photoalbum-style hypertext "book". The output form can be selected by the user or, in the absence of a user choice, be automatically selected by the system 200.

III. Exemplary Operating Environment

The video composition authoring system 200 of the present invention is designed to operate in a computing environment. The follow discussion is intended to provide a brief, general description of a suitable computing environment in which the invention may be implemented.

Figure 3:
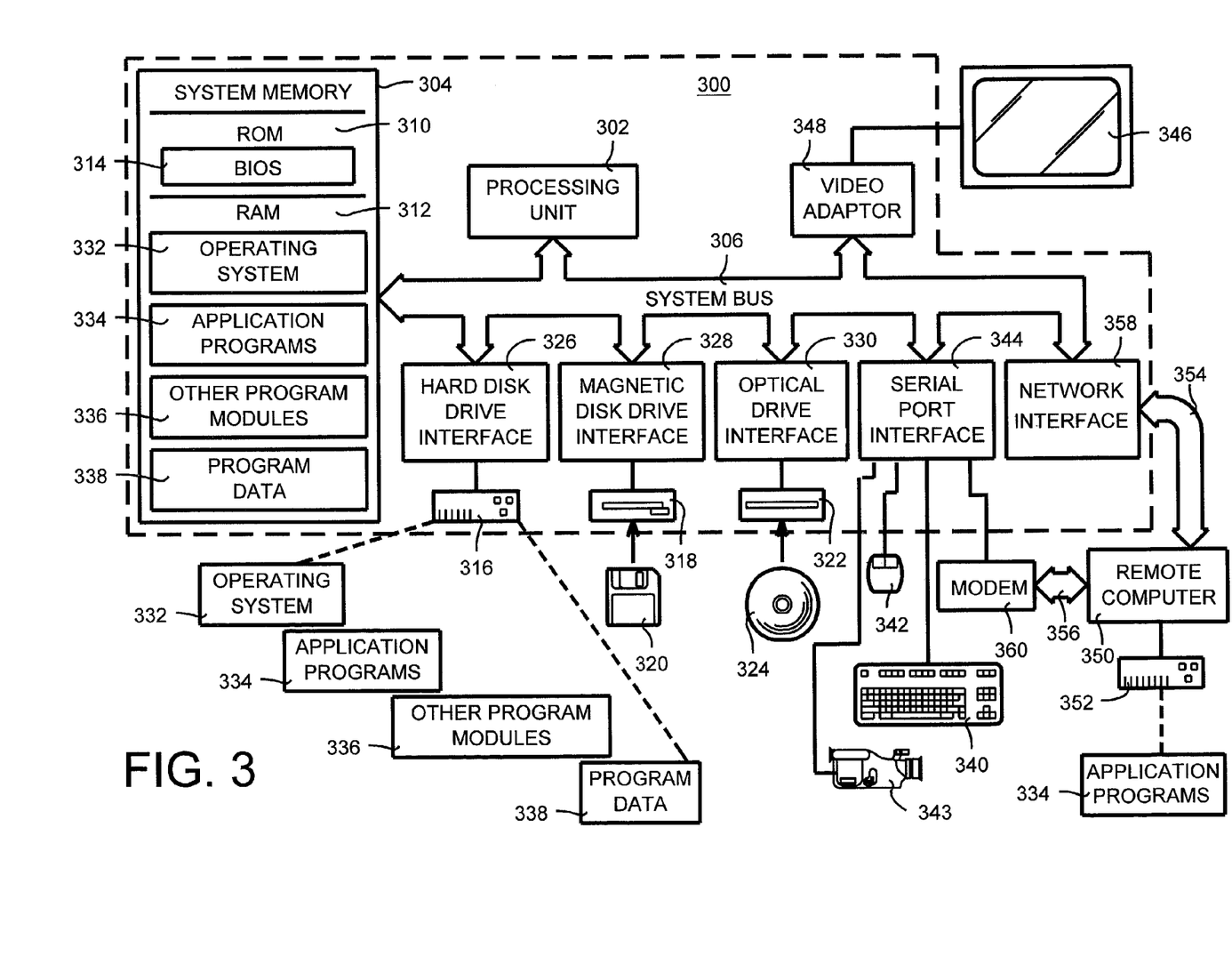
FIG. 3 is a block diagram illustrating a computing apparatus suitable for carrying out the invention.

FIG. 3 is a block diagram illustrating a computing apparatus suitable for carrying out the invention. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 3, an exemplary system for implementing the invention includes a general-purpose computing device 300. In particular, the computing device 300 includes the processing unit 302, a system memory 304, and a system bus 306 that couples various system components including the system memory 304 to the processing unit 302. The system bus 306 may be any of several types of bus structures including a memory bus or memory controller, a peripheral bus, and a local bus using any of a variety of bus architectures. The system memory includes read only memory (ROM) 310 and random access memory (RAM) 312. A basic input/output system (BIOS) 314, containing the basic routines that help to transfer information between elements within the computing device 300, such as during start-up, is stored in ROM 310. The computing device 300 further includes a hard disk drive 316 for reading from and writing to a hard disk, not shown, a magnetic disk drive 318 for reading from or writing to a removable magnetic disk 320, and an optical disk drive 322 for reading from or writing to a removable optical disk 324 such as a CD-ROM or other optical media. The hard disk drive 316, magnetic disk drive 328 and optical disk drive 322 are connected to the system bus 306 by a hard disk drive interface 326, a magnetic disk drive interface 328 and an optical disk drive interface 330, respectively. The drives and their associated computer-readable media provide nonvolatile storage of computer readable instructions, data structures, program modules and other data for the computing device 300.

Although the exemplary environment described herein employs a hard disk, a removable magnetic disk 320 and a removable optical disk 324, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 320, optical disk 324, ROM 310 or RAM 312, including an operating system 332, one or more application programs 334, other program modules 336 (such as the video composition authoring system 200) and program data 338. A user (not shown) may enter commands and information into the computing device 300 through input devices such as a keyboard 340 and a pointing device 342. In addition, a camera 343 (such as a video camera) may be connected to the computing device 300 as well as other input devices (not shown) including, for example, a microphone, joystick, game pad, satellite dish, scanner, or the like. These other input devices are often connected to the processing unit 302 through a serial port interface 344 that is coupled to the system bus 306, but may be connected by other interfaces, such as a parallel port, a game port or a universal serial bus (USB). The monitor 346 (or other type of display device) is also connected to the system bus 306 via an interface, such as a video adapter 348. In addition to the monitor 346, computing devices such as personal computers typically include other peripheral output devices (not shown), such as speakers and printers.

The computing device 300 may operate in a networked environment using logical connections to one or more remote computers, such as a remote computer 350. The remote computer 350 may be another personal computer, a server, a router, a network PC, a peer device or other common network node, and typically includes many or all of the elements described above relative to the computing device 300, although only a memory storage device 352 has been illustrated in FIG. 3. The logical connections depicted in FIG. 3 include a local area network (LAN) 354 and a wide area network (WAN) 356. Such networking environments are commonplace in offices, enterprise-wide computer networks, intranets and the Internet.

When used in a LAN networking environment, the computing device 300 is connected to the local network 354 through a network interface or adapter 358. When used in a WAN networking environment, the computing device 300 typically includes a modem 360 or other means for establishing communications over the wide area network 356, such as the Internet. The modem 360, which may be internal or external, is connected to the system bus 306 via the serial port interface 344. In a networked environment, program modules depicted relative to the computing device 300, or portions thereof, may be stored in the remote memory storage device 352. It will be appreciated that the network connections shown are exemplary and other means of establishing a communications link between the computers may be used.

IV. Operational Overview and Details

Figure 4:
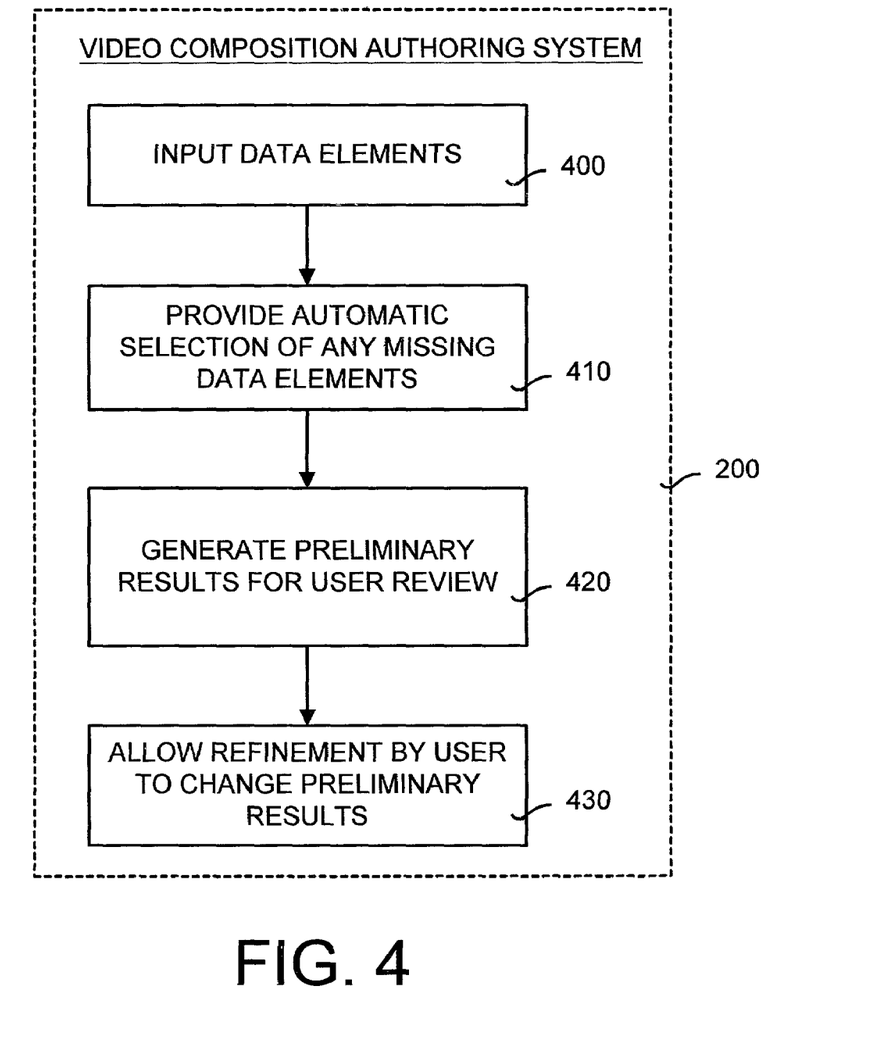
FIG. 4 is a general flow diagram illustrating the operation of the video composition authoring system shown in FIG. 2.

FIG. 4 is a general flow diagram illustrating the operation of the video composition authoring system 200 shown in FIG. 2. In general, the video composition authoring system 200 provides an aesthetically-pleasing layout of data elements, including multimedia elements (such as video, cliplet, and sound). In particular, the video composition authoring system 200 operates by inputting data elements (box 400). These data elements include multimedia elements, parameter information and description information as described above.

Any data elements that are missing but needed (as determined by the system 200) are automatically selected (box 410). Thus, if a user specifies less than all the necessary data elements needed to author a video composition, then the missing data elements are automatically chosen by the system 200. Next, preliminary video composition results are generated for user review (box 420). The user is allowed to makes refinements and changes to change any portion of the preliminary video composition results (box 430).

Element Selection and Layout Module

Figure 5:
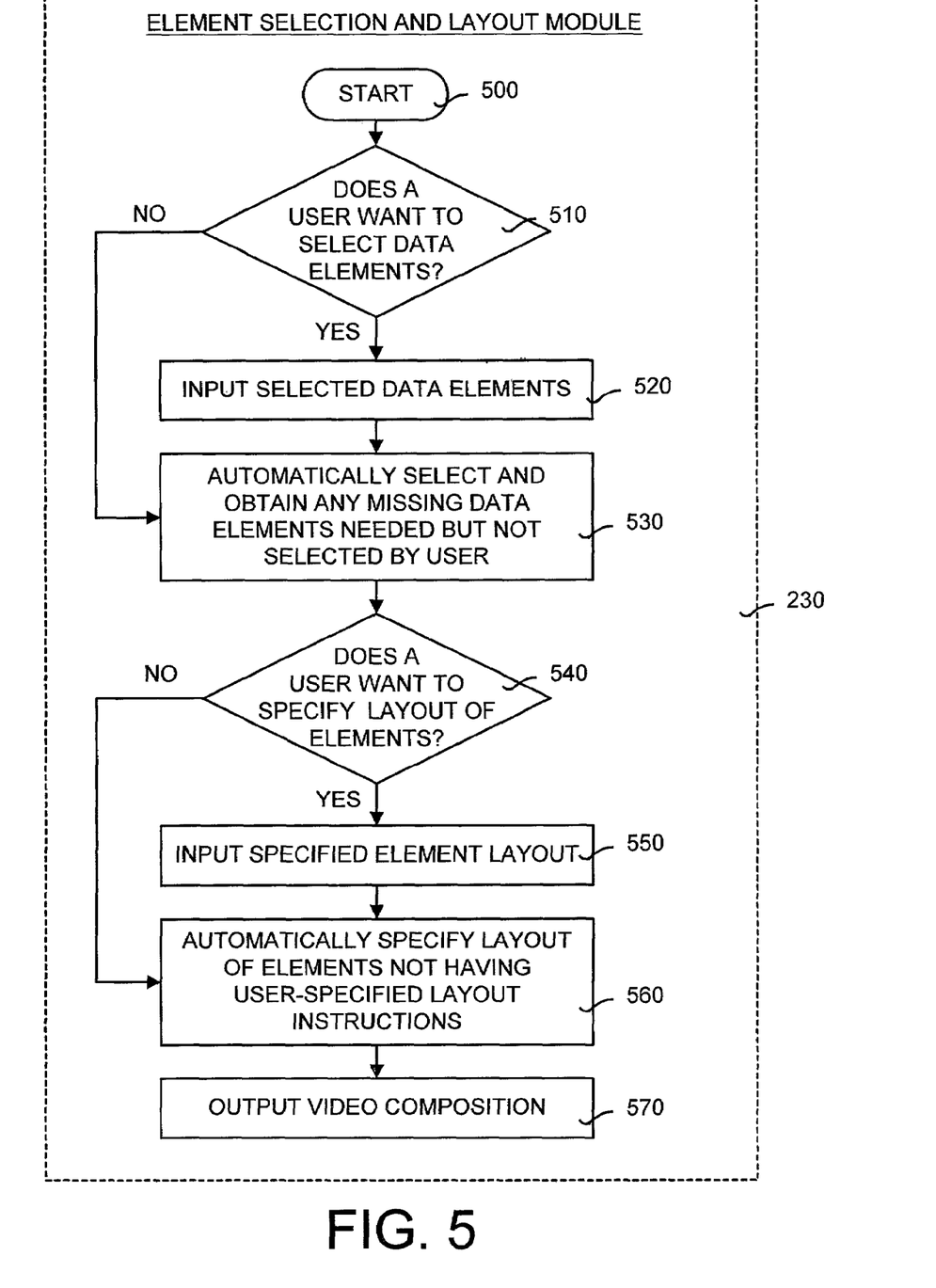
FIG. 5 is a detailed flow diagram illustrating the operational details of the element selection and layout module shown in FIG. 2.

FIG. 5 is a detailed flow diagram illustrating the operational details of the element selection and layout module 230 shown in FIG. 2. The element selection and layout module 230 selects data elements and designs the layout of the elements with a video composition. Selection of the data elements occurs by user-specified instructions, automatically-generated selection by the module 230, or a combination of both.

The operation of the element selection and layout module 230 starts (box 500) by determining whether a user wants to select data elements (box 510). The user has the capability to select all of the data elements, none of the data elements, or a combination of user-selection and automatic-selection. If a user decides to select data elements, the selected data elements are inputted to the module 230 (box 520). Otherwise, the operation skips inputting user selected data element.

Next, the module 230 automatically selects and obtains any missing data element that is needed but was not specified or selected by the user (box 530). The module 230 may automatically select all, none, or any amount in between of the necessary data elements, depending on the amount of user input. Once the data elements are selected a determination is made whether the user wants to specify the layout of the data elements (box 540). If so, then the specified element layout is received as input from the user (box 550). Otherwise, this process is skipped.

The layout of elements not having a layout specified by a user then is automatically performed (box 560). Once again, the number of data elements having their layout determined automatically is a function of how much input the user provides. If little or no user input is provided, then the module 230 automatically specifies the layout for all or most of the selected data elements. On the other hand, if most or all of the layout for the data elements is specified by the user, the module 230 automatically determines few or none of the layout for the data elements. Once the layout of the data elements is determined, a video composition is sent as output (box 570).

Functionality of the Element Selection and Layout Module

The element selection and layout module 230 contains certain functionality that allows a video composition to be authored. The specific functionality is as follows:

Cliplet Interest Ratings

If the video composition authoring system 200 uses cliplets, the cliplets may have interest ratings assigned to them based upon processing technologies that are available to provide information about the cliplet. For example, if face detection technology is available, then each individual cliplet can be processed to detect faces. The information obtained from this processing, such as whether the cliplet contains a face, is then stored with each individual cliplet. Based on this information an interest rating in face detection then can be determined for each cliplet. The interest ratings are associated per cliplet, rather than per video frame. Computation of the features used in the rating process, however, may have been performed per frame, and stored for later use during the cliplet rating process.

Cliplet ratings can be based on any information relevant to and available for a cliplet. This cliplet rating information includes time stamps, location stamps, audio signal, video signal and all of the information and analyses as discussed above concerning sub-shot boundary detection. Cliplet rating information can take advantage of whatever technology is available to provide information about a cliplet. This includes voice recognition, speaker recognition, face detection, zoom detection, pan detection, any type of audio analyses or recognition, and any type of video analyses or recognition. Any of these technologies may be used to generate an interest rating for an individual cliplet. By way of example, is the interest rating is in detecting faces, then cliplets containing faces would have a higher interest rating than those cliplet without faces, and among cliplets with faces, those which contain faces facing the camera for a greater percentage of the time may be rated higher. As another example, if the interest rating is in close-ups, then cliplets that immediately follow a zooming event would have a higher interest rating than other cliplets.

Cliplet interest ratings may be multi-dimensional. For example, a cliplet may have a rating for "audio activity level" as well as separate ratings for "visual activity level" and "occurrence of faces". Ratings may be absolute numeric values or may be relative orderings (or rankings) between cliplets. By way of example, assume that a rating is to be assigned to a cliplet based on audio. This can be performed by computing a variance in an audio power signal, normalized over all known cliplets. In another example of cliplet rating using vision, assume that camera zoom or pan is detected and higher ratings are assigned to cliplets immediately following a zoom or pan event. In yet another example of cliplet rating using, duration is to make a rating proportional to a Gaussian centered on durations of x seconds, where x might be based on user preferences or expectations.

Automatic Space Adaptation

The output of the video composition authoring system 200 includes a video composition containing a collage of cliplets. The collage includes a plurality of windows, with a cliplet contained in each window. Depending on the size of the windows, the collage of cliplets can adapt so that the cliplets will move around and try to fit in the available space, while maintaining some pleasant or aesthetically-pleasing layout. This space adaptation is performed automatically by the element selection and layout module 230.

Automatic Selection of Cliplet Collage Contents

If a user does not want to work hard, the video composition authoring system 200 can automatically select cliplets to populate the windows of the video composition collage based on user preferences or randomly.

By way of example, in the video composition authoring system 200 can create a plurality of windows that are blank. The windows then can be filled automatically by using one or more of the following algorithms. One algorithm for the automatic selection could be based on interest ratings. For example, the top N cliplets in a category can be determined and taken from each category and placed in each of the windows automatically. These categories may include, for example, interesting audio in an audio ratings category, interesting faces in a facial ratings category, and close-ups in a zoom ratings category. The criteria for what constitutes the "top" is dependent on the category. For example, in the zoom category, the cliplets containing close-ups would be considered the "top" in that category.

Another algorithm for automatic selection could be use the interest ratings along with a time constraint. If, out of the top N cliplets in a category, two of the cliplets are close in time, then the module 230 assumes that the two cliplets are from the same scene. In order to provide variety, one of the cliplets is chosen and the other is discarded.

Another algorithm is to perform a random selection from the top cliplets in each category. For example, instead of taking only top N cliplets in each category, this algorithm designates a top M number of cliplets from a category (where M>N), and random selects N cliplets from the M available cliplets. In this manner, the variety is maintained in the output video composition.

Usage Statistics

The element selection and layout module 230 also can select and populate the video composition collage based on usage statistics. Usage statistics track the frequency of cliplet usage. These results may be displayed to a user. Usage statistics are computed as users interact with cliplets through the element selection and layout module 230.

Every time a user views or selects a cliplet the usage rating for that cliplet increases. Usage statistics are a type of cliplet interest rating that alleviates the need to explicitly ask the user to specify what type or category of cliplet he prefers. Over time usage statistics become more accurate in determining which cliplets are interesting to a user.

Usage statistics can be correlated with other cliplet interest ratings. This correlation can be used to adjust and train the interest ratings and the cliplet rating process over time based on the usage ratings and what is interesting to the user. By way of example, if a user is consistently looking at cliplets that have a lot of interesting audio, then it can be deduced that the audio interest ratings are important to the user. Thus, it can be determined that the user prefers and is interested in cliplets having high audio interest ratings. By correlating the usage statistics with the interest ratings, over time the system 200 "learns" the preferences of the user. This knowledge can be used, for example, when selecting cliplets to populate windows of the video composition collage.

Video Composition Output Style Selection

The element selection and layout module 230 allows a user to select an output style of the video composition. According the style selected, the module 230 selects and arranges data elements in accordance with the selected style. For example, if a user selected a "romantic" style, the module 230 might select soft music, choose video elements lacking fast action, add slow motion, and slightly blur the video elements in keeping the romantic theme.

Iterative Refinement Module

Figure 6:
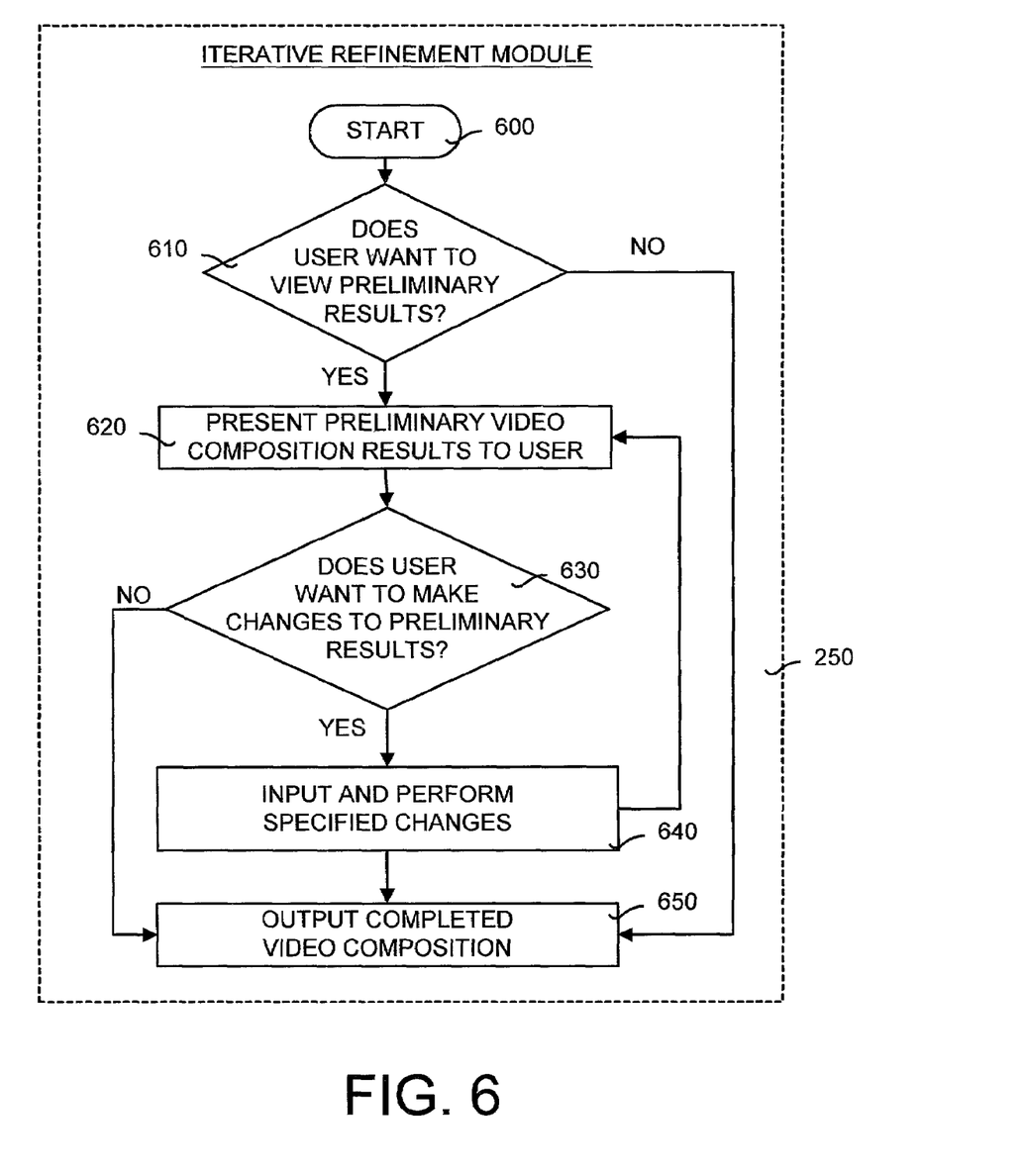
FIG. 6 is a detailed flow diagram illustrating the operational details of the iterative refinement module shown in FIG. 2.

FIG. 6 is a detailed flow diagram illustrating the operational details of the iterative refinement module 250 shown in FIG. 2. The iterative refinement module 250 presents preliminary video compositions results to a user. If the user likes the results the preliminary video compositions results are left unchanged and sent as a video composition output. If the user does not like the results, the iterative refinement module 250 allows the user to make changes and refine the data elements or their layout that is unacceptable to the user.

The operation of the iterative refinement module 250 being (box 600) by determining whether a user wants to view a preliminary video composition results (box 610). If so, then the module 250 presents the preliminary video composition results to the user (box 620). If not, then the preliminary video composition results are considered a completed video composition. Next, a determination is made whether the user wants to make changes to the preliminary video composition results (box 630). If the user does want to make changes, the module 250 allows the user to input the changes and then performs those changes specified (box 640). Then the updated preliminary video composition results are presented to the user (box 620). This iterative process continues until the user is satisfied with the preliminary video composition results. If the user does not want to make changes, then the preliminary video composition results are sent as output as a completed video composition (box 650).

Functionality of the Iterative Refinement Module

The iterative refinement module 250 contains certain functionality that allows a video composition to be authored. The specific functionality is as follows:

Drag and Drop Refinement

The iterative refinement module 250 provides drag and drop functionality such that elements of the video composition may be modified, added, or deleted. This drag and drop functionality allows a user to drag and drop a desired cliplet to a desired position within the video composition.

Refinement of Cliplet Boundaries

Even though the starting and ending points (or editing points) of cliplets already are determined, a user may be unsatisfied with them. The iterative refinement module 250 allows the user to lengthen cliplets by merging a cliplet with its temporal neighbors. This is achieved by using an input device to merge at least two of the video cliplets such that a first cliplet merges with a second cliplet to create a new, third cliplet. The third cliplet is the duration of the first and second cliplets combined. This allows a user to lengthen and combine a cliplet with any of its temporal neighbors with requiring any scrubbing.

If the user is still unhappy with the editing points of a cliplets, the iterative refinement module 250 includes functionality that allows a user to extend or shrink either the starting or the ending points. To avoid scrubbing, the user has the option of having the system automatically find one or two new editing points. Through the input device, the use can request that the iterative refinement module 250 present other starting and ending point possibilities for the cliplet.

Title and Credits Generation

Title and credit generation require a user to enter the cast of the video composition collage and who contributed to the video footage. Next, the iterative refinement module 250 generates a credits and cast list. If less user input is desired, the module 250 can use face recognition technology to "learn" the names of people. This occurs by having the user enter name of person once and then the module 250 automatically recognizes those people subsequently and is able to automatically create a cast list.

Text Annotation

Text may be added to the video composition either by user input or automatically by the system 200. Text may be used to annotate, describe, or compliment the video composition. The iterative refinement module 250 provides a user the functionality to add text annotation and determine where on the video composition the text will be located. In addition, various text styles and sizes are available for the user to choose.

V. Working Example

The following working example is used to illustrate the operational details of the invention. This working example is provided as an example of one way in which the video composition authoring system 200 may be implemented. It should be noted that this working example is only one way in which the invention may be implemented, and is provided for illustrative purposes only.

Figure 7:
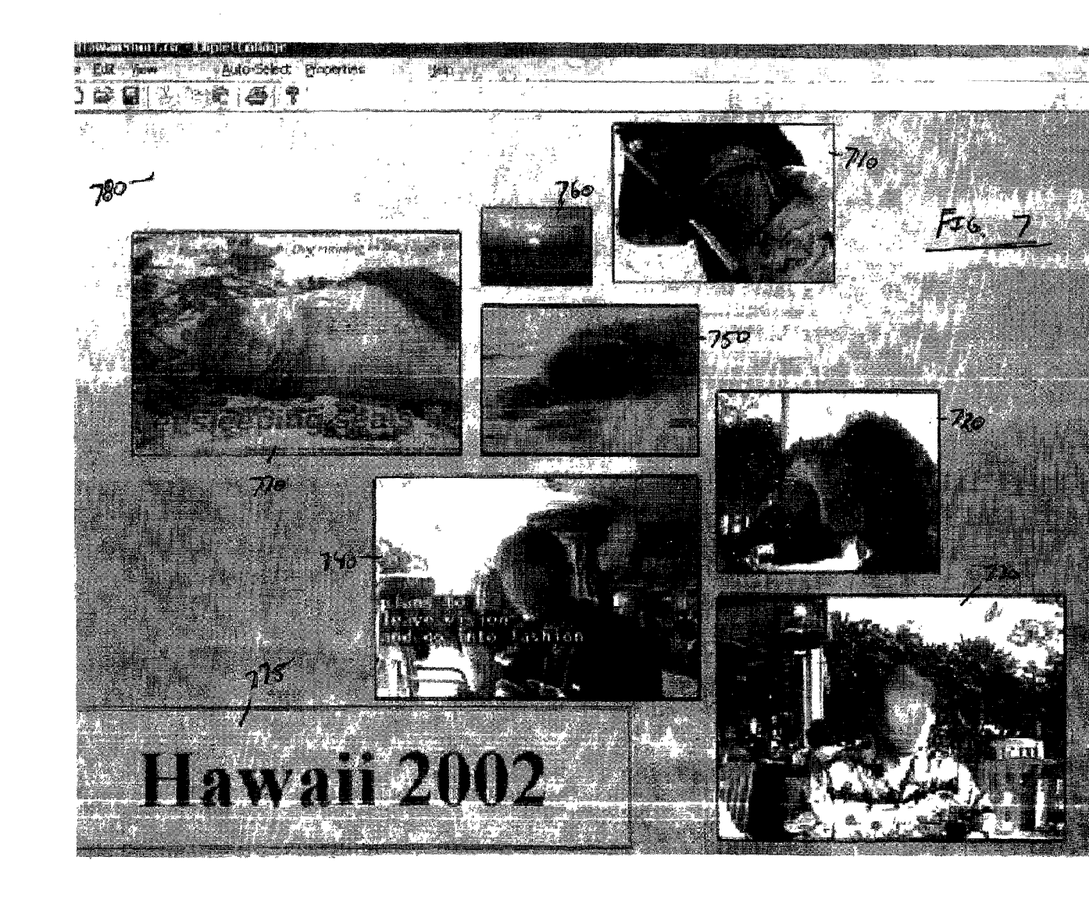
FIG. 7 is a computer user interface illustrating a working example of the output of the video composition authoring system.

FIG. 7 is a working example of a video composition authored using the video composition authoring system 200. In this working example, a video composition 700 is a two-dimensional layout or collage of cliplets and other multimedia elements. The video composition 700 includes a plurality of windows 710 arranged in an aesthetically-pleasing manner. Within each of the plurality of windows, 710, 720, 730, 740, 750, 760 and 770, are cliplets capable of being played within each window. In addition, the video composition 700 includes a title 775 describing the video composition 700. The video composition 700 also includes added text that enhances the contents of a window. For example, in windows 740 and 770 text has been added that describes or enhances the contents. A background picture 780 of a sunset has been added to the video composition 700. Also included in the video composition is an audio file containing Hawaiian music.

The following discussion is intended to provide an example of how the video composition authoring system 200 might obtain the elements of a video composition, such as the video composition 700 shown in FIG. 7. Suppose a user provides nothing but a set of cliplets that contain the date and time and the location of where they were photographed. The video composition authoring system 200 might do the following. First, the element selection and layout module 230 might select the best cliplets from the input set of cliplets. Determining the best cliplets may be based on cliplet ratings. Next, the a title might be deduced by using the calendar information. For example, if the video was photographed in Hawaii on or around February $14^{th}$, the title generated might be "Valentine's Day in Hawaii".

In order to determine what other data elements should be selected, the element selection and layout module 230 might use a natural-language database to generate key words or search terms. For example, using the "Valentine's Day in Hawaii" example, these terms may include "romantic", "aloha", "Kauai", "Oahu", "St. Valentine", and "chocolate". Next, a search may be performed, either on the user's database or on the Internet, for additional data elements. For example, the element selection and layout module 230 might search a free music Internet site for "Hawaii" and "romantic" and return an audio file containing Hawaiian music.

Similarly, a background photograph could be selected by the element selection and layout module 230 using the search terms and the user's own database, the Internet, or both. For example, the element selection and layout module 230 might search the user's hard drive for a background photograph of a sunset. In addition, a "romantic" mood might be selected for the video composition such that selected cliplets will tend to be longer. Moreover, the cliplets selected will tend to be biased toward those cliplets that do not contain fast motion. In keeping with romantic mood selection, the selected cliplets may undergo image processing such as intentional blurring to soften the edges. Face detection may be used to select cliplets that contain close-ups of faces.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for authoring a video composition from source video using short segments of the source video called video cliplets, comprising:
   generating a set of windows to be contained within the video composition;
   automatically selecting a cliplet to be placed within each window of the set of windows so as to create the video composition based on multi-dimensional cliplet interest ratings associated with the cliplet, wherein automatically selecting a cliplet further comprises:
   defining cliplet interest rating categories;
   ranking each of the cliplets in each of the cliplet interest rating categories;
   selecting the top-ranked cliplets in each of the cliplet interest rating categories to be placed in each of the windows;
   presenting the video composition to a user for review;
   allowing the user to change the cliplets within each of the windows if the user not satisfied with the video composition after the review;
   allowing a user to choose an output style of the video composition;
   determining whether any of the top-ranked cliplets in each of the cliplet interest rating categories are close in time; and
   if so, then choosing one of the top-ranked cliplets that are close in time and discarding the other ones of the top-ranked cliplets that are close in time.

2. The method as set forth in claim 1, wherein the multi-dimensional cliplet interest ratings include at least one of the following: (a) voice recognition; (b) speaker recognition; (c) face detection; (d) zoom detection; (e) pan detection; (f) any type of audio analyses; (g) any type of audio recognition; (h) any type of video analyses; (i) any type of video recognition.

3. A computer-readable medium having computer-executable instructions for performing the method recited in claim 1.

4. The method as set forth in claim 1, wherein automatically selecting a cliplet further comprises correlating usage statistics with the cliplet interest ratings to increase the accuracy of the cliplet interest ratings.

5. The method as set forth in claim 1, wherein automatically selecting a cliplet further comprises:
   defining a set of M number of cliplets within each of the cliplet interest rating categories; and
   randomly selecting for each of the cliplet interest rating categories a set of N number of cliplets from the set of M number of cliplets, where M is greater than N.

6. The method as set forth in claim 1, wherein allowing the user to change the cliplets within each of the windows further comprises providing drag and drop functionality such that using an input device a user can perform at least one of the following in the video composition: (a) change a location of a cliplet; (b) modify the cliplet; (c) add a cliplet; (d) delete a cliplet.

7. The method as set forth in claim 1, further comprising allowing the user to add text annotation to any of the cliplets.

8. The method as set forth in claim 1, further comprising allowing a user to add text annotation to the video composition.

9. The method as set forth in claim 1, further comprising allowing a user to add at least one of the following to the video composition: (a) a title for the video composition; (b) a credits list.

10. The method as set forth in claim 1 comprising:
creating a layout of the video composition as a two-dimensional collage of cliplet windows;
allowing the user to select video cliplets to place in the cliplet windows; and
automatically selecting video cliplets to place in the cliplet windows if the user does not select enough video cliplets to fill each of the cliplet windows.

11. The method as set forth in claim 10, wherein creating a layout of the video composition further comprises automatically determining a layout of the two-dimensional collage of cliplets windows.

12. The method as set forth in claim 10, wherein creating a layout of the video composition further comprises allowing a the user to determine a layout of the two-dimensional collage of cliplets windows.

13. The method as set forth in claim 10, further comprising allowing the user to review the video composition and change the video composition if the user desires.

14. The method as set forth in claim 1, comprising:
obtaining usage statistics by tracking a frequency of usage of the video cliplets;
correlating the usage statistics with the cliplet interest ratings to adjust and train the cliplet interest ratings;
generating preliminary video composition results for the user to review; and
refining the preliminary video composition results if the user so desires.

15. The method as set forth in claim 14, further comprising:
displaying a layout of the video composition as a two-dimensional collage of cliplet windows; and
selecting cliplets to populate the cliplet windows based on the correlated usage statistics.

16. The method as set forth in claim 1, comprising allowing user refinement of the video composition through use of a drag and drop function.

* * * * *